US012579763B2

(12) United States Patent
Bouazizi et al.

(10) Patent No.: US 12,579,763 B2
(45) Date of Patent: Mar. 17, 2026

(54) SIGNALING POSE INFORMATION TO A SPLIT RENDERING SERVER FOR AUGMENTED REALITY COMMUNICATION SESSIONS

(71) Applicant: QUALCOMM Incorporated, San Diego, CA (US)

(72) Inventors: Imed Bouazizi, Frisco, TX (US); Thomas Stockhammer, Bergen (DE); Yong He, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 222 days.

(21) Appl. No.: 18/438,631

(22) Filed: Feb. 12, 2024

(65) Prior Publication Data

US 2024/0273833 A1 Aug. 15, 2024

Related U.S. Application Data

(60) Provisional application No. 63/484,620, filed on Feb. 13, 2023.

(51) Int. Cl.
*G06T 19/00* (2011.01)
*G06T 15/00* (2011.01)
*G06T 15/20* (2011.01)

(52) U.S. Cl.
CPC .......... *G06T 19/006* (2013.01); *G06T 15/005* (2013.01); *G06T 15/20* (2013.01)

(58) Field of Classification Search
None
See application file for complete search history.

(56) References Cited

U.S. PATENT DOCUMENTS

2020/0225473 A1* 7/2020 Selan ...................... G06F 3/017
2020/0364901 A1* 11/2020 Choudhuri ............. G06F 3/005
2021/0185294 A1* 6/2021 Malaika ................... G06T 7/73
2022/0021864 A1 1/2022 Mate et al.

OTHER PUBLICATIONS

3GPP: 3rd Generation Partnership Project, Technical Specification Group Services and System Aspects, 5G Real-time Media Transport Protocol Configurations (Release 18), TS 26.522 V0.2.0, Nov. 2023, pp. 1-30.
3GPP: 3rd Generation Partnership Project, Technical Specification Group Services and System Aspects, Split Rendering Media Service Enabler, (Release 18), TS 26.565 V1.0.0, Dec. 2023, pp. 1-37.

(Continued)

*Primary Examiner* — Tapas Mazumder
(74) *Attorney, Agent, or Firm* — Shumaker & Sieffert, P.A.

(57) ABSTRACT

An example device for presenting split-rendered media data includes a memory configured to store media data; and a processing system comprising one or more processors implemented in circuitry, the processing system being configured to: send pose information representing a predicted pose of a user at a first future time to a split rendering server; receive an at least partially rendered image for the first future time and data associating the pose information with the at least partially rendered image from the split rendering server; and at a second future time, present a rendered image based on the partially rendered image.

22 Claims, 11 Drawing Sheets

(56) References Cited

OTHER PUBLICATIONS

3GPP TR 26.926: "3rd Generation Partnership Project, Technical Specification Group Services and System Aspects, Traffic Models and Quality Evaluation Methods for Media and XR Services in 5G Systems, (Release 18)", V1.3.0, Nov. 2022, pp. 1-56.
3GPP TR 26.998: "3rd Generation Partnership Project, Technical Specification Group Services and System Aspects, Support of 5G Glass-type Augmented Reality / Mixed Reality (AR/MR) Devices, (Release 18)", 3GPP TR 26.998 V18.0.0, Dec. 2022, pp. 1-121.
International Search Report and Written Opinion—PCT/US2024/015524—ISA/EPO—May 15, 2024.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

MPEG Systems: "Exploration on Definition and Carriage of Sample-Auxiliary Metadata for Network Rendered Media", International Organization for Standardization Organisation Internationale De Normalisation ISO/IEC JTC 1/SC 29/WG 03 Mpeg Systems Oct. 2023, Hanover, Germany, 17 Pages.
Nokia Corporation (Rapporteur): "5G_RTP Permanent Document v. 0.0.3", S4-221559, 3GPP TSG SA WG4 Meeting #121 Toulouse (France), Nov. 14-18, 2022, 7 Pages.
Qualcomm: "Signaling the Render Pose and Other Related Information", S4-230140, TSG SA4 Meeting #122 Feb. 20-24, 2023, Athens, Greece, 7 Pages.
Qualcomm Inc: "Signaling the Render Pose and Other Related Information", TSG SA4 Meeting #122, S4-230359, Feb. 20-24, 2023, Athens, Greece, pp. 1-7.
Schulzrinne H., et al., "RTP: A Transport Protocol for Real-Time Applications", Network Working Group, Request for Comments: 3550, No. 1889, Jul. 2003, XP003022794, The Internet Society, pp. 1-89.
Singer D., et al., "A General Mechanism for RTP Header Extensions; rfc8285.txt", Internet Engineering Task Force (IETF), Obsoletes: 5285, Standard, Internet Society (ISOC) 4, Rue Des Falaises CH-1205, Geneva, Switzerland, Oct. 26, 2017, pp. 1-25.

* cited by examiner

3D Scene

2D + Depth

2D
2 eye buffers

2D

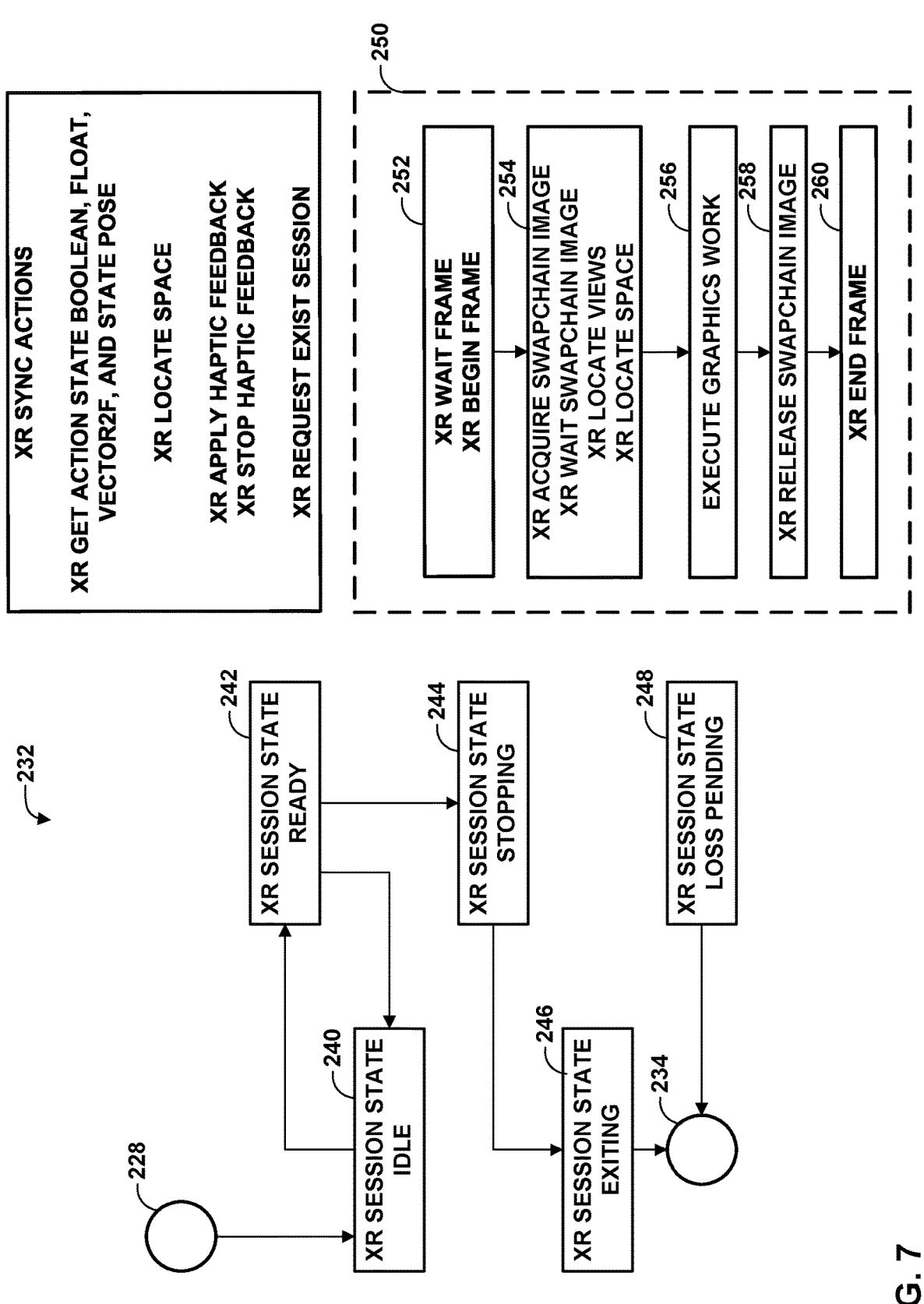

XR SYNC ACTIONS

XR GET ACTION STATE BOOLEAN, FLOAT, VECTOR2F, AND STATE POSE

XR LOCATE SPACE

XR APPLY HAPTIC FEEDBACK
XR STOP HAPTIC FEEDBACK

XR REQUEST EXIST SESSION

250

252
XR WAIT FRAME
XR BEGIN FRAME

254
XR ACQUIRE SWAPCHAIN IMAGE
XR WAIT SWAPCHAIN IMAGE
XR LOCATE VIEWS
XR LOCATE SPACE

256
EXECUTE GRAPHICS WORK

258
XR RELEASE SWAPCHAIN IMAGE

260
XR END FRAME

232

228

240
XR SESSION STATE IDLE

242
XR SESSION STATE READY

244
XR SESSION STATE STOPPING

246
XR SESSION STATE EXITING

248
XR SESSION STATE LOSS PENDING

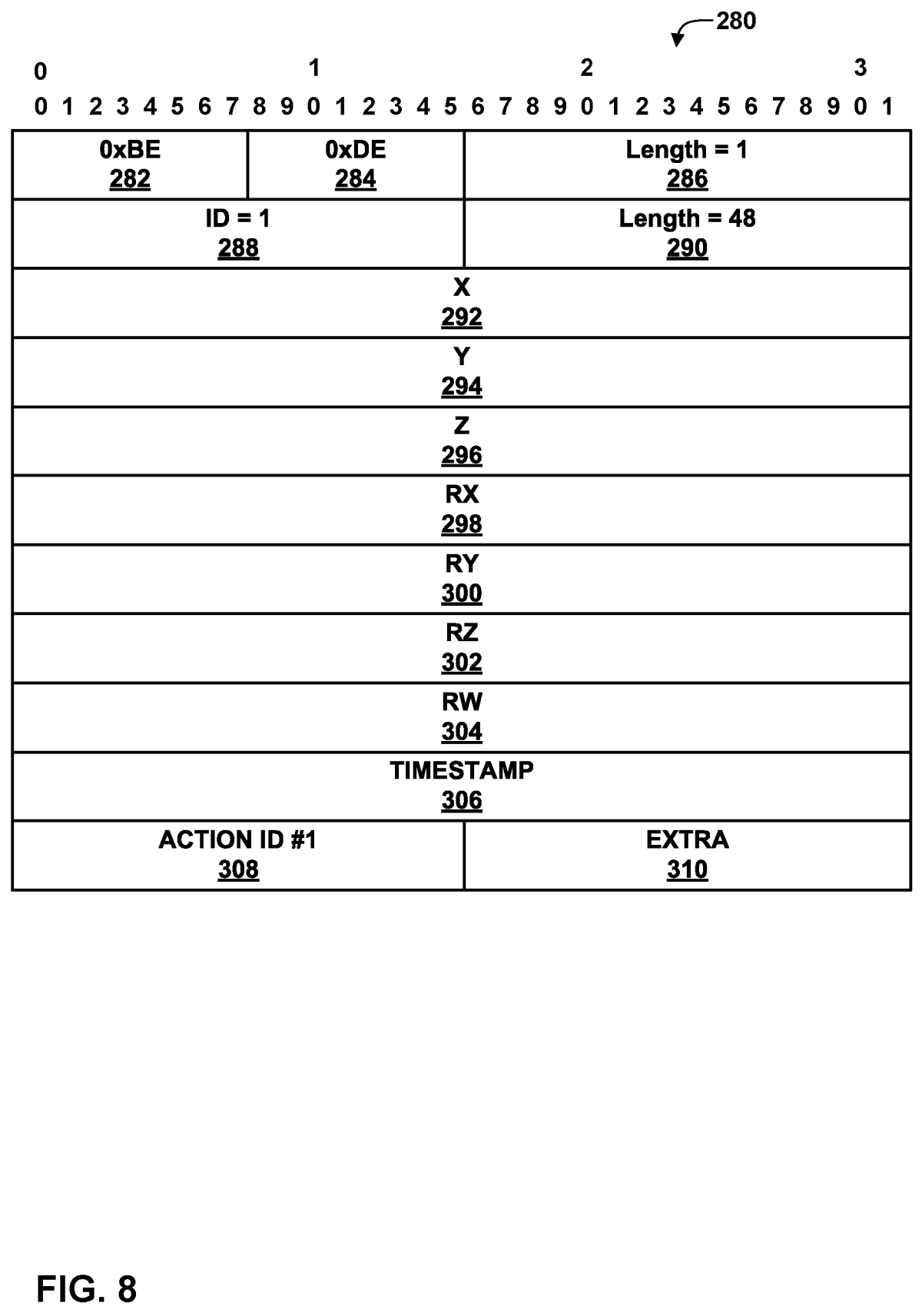

| 0 | 1 | 2 | 3 |
|---|---|---|---|

0 1 2 3 4 5 6 7 8 9 0 1 2 3 4 5 6 7 8 9 0 1 2 3 4 5 6 7 8 9 0 1

| 0xBE 282 | 0xDE 284 | Length = 1 286 | |
|---|---|---|---|
| ID = 1 288 | | Length = 48 290 | |
| X 292 | | | |
| Y 294 | | | |
| Z 296 | | | |
| RX 298 | | | |
| RY 300 | | | |
| RZ 302 | | | |
| RW 304 | | | |
| TIMESTAMP 306 | | | |
| ACTION ID #1 308 | | EXTRA 310 | |

FIG. 8

DETERMINE CURRENT POSE ⁓330

PREDICT FUTURE POSE(S) ⁓332

PREDICT FUTURE ACTION(S) ⁓334

SEND PREDICTED FUTURE POSES AND ACTIONS TO SPLIT RENDERING SERVER ⁓336

RECEIVE FRAME(S) FOR PREDICTED FUTURE POSE(S) AND ACTION(S) ⁓338

BUFFER RECEIVED FRAMES ⁓340

DETERMINE CURRENT POSE AND ACTION AT DISPLAY TIME ⁓342

SELECT BUFFERED FRAME ⁓344

UPDATE BUFFERED FRAME ⁓346

DISPLAY UPDATED FRAME ⁓348

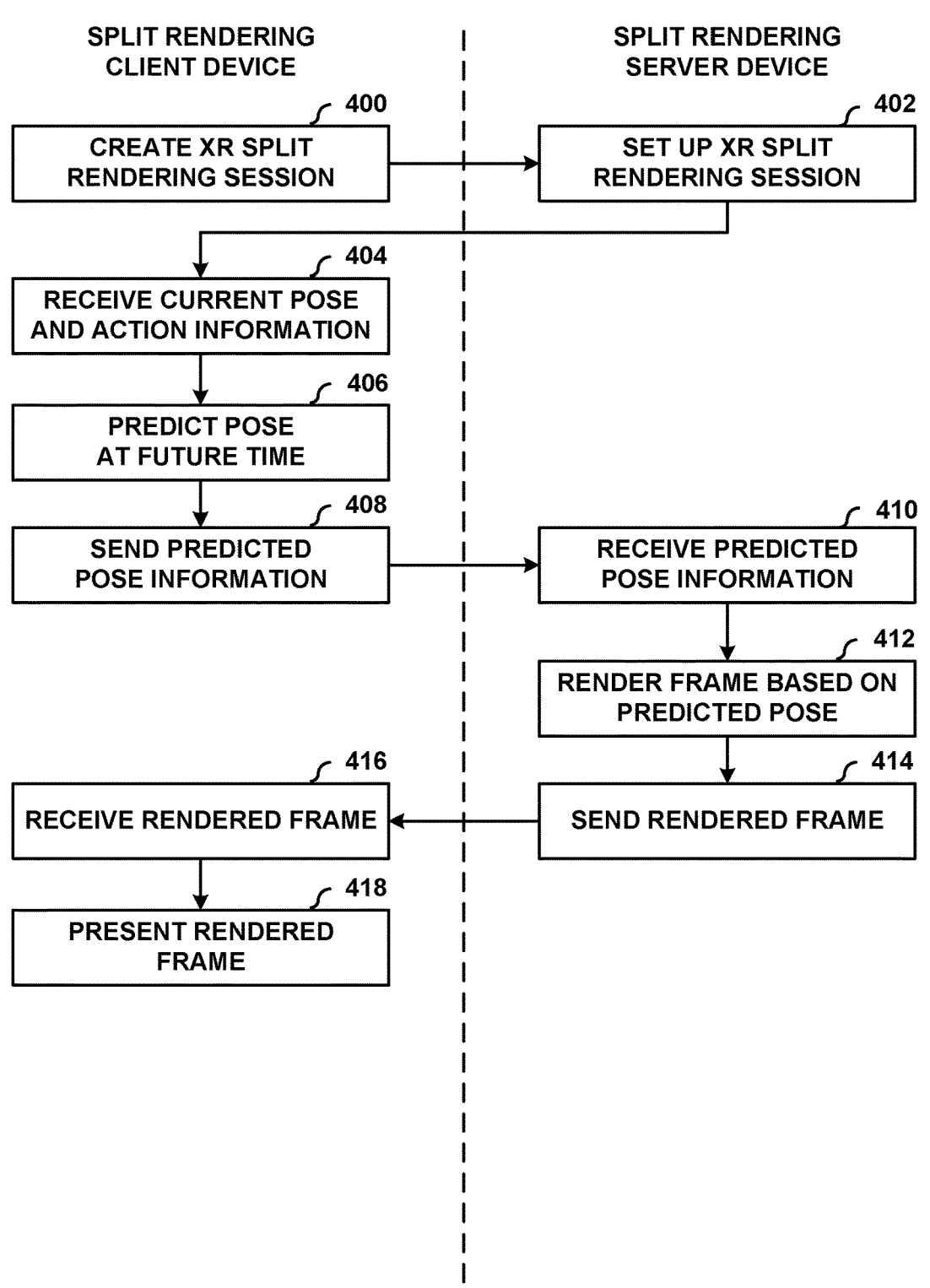

SPLIT RENDERING
CLIENT DEVICE

SPLIT RENDERING
SERVER DEVICE

400
CREATE XR SPLIT
RENDERING SESSION

402
SET UP XR SPLIT
RENDERING SESSION

404
RECEIVE CURRENT POSE
AND ACTION INFORMATION

406
PREDICT POSE
AT FUTURE TIME

408
SEND PREDICTED
POSE INFORMATION

410
RECEIVE PREDICTED
POSE INFORMATION

412
RENDER FRAME BASED ON
PREDICTED POSE

416
RECEIVE RENDERED FRAME

414
SEND RENDERED FRAME

418
PRESENT RENDERED
FRAME

FIG. 10

SIGNALING POSE INFORMATION TO A SPLIT RENDERING SERVER FOR AUGMENTED REALITY COMMUNICATION SESSIONS

This application claims the benefit of U.S. Provisional Application No. 63/484,620, filed Feb. 13, 2023, the entire contents of which are hereby incorporated by reference.

TECHNICAL FIELD

This disclosure relates to transport of media data, and more particularly, to split rendering of augmented reality media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for performing split rendering of augmented reality (AR) media data. In general, split rendering involves a device (which may be referred to as a "split rendering server"), such as a server in a network, a desktop computer, laptop computer, gaming console, cellular phone, or the like, that receives transmitted media data, and at least partially renders the media data, then sends the at least partially rendered media data to a display device, such as AR glasses, a head mounted display (HMD), or the like. The display device then displays the media data, after potentially completing the rendering process. According to the techniques of this disclosure, the split rendering server may stream rendered frame(s) using one or more video streams to the display device. The split rendering server may use an RTP header extension to associate rendered frames with a particular user pose as carried as part of RTP packets that carry rendered images of a frame.

In one example, a method of presenting media data includes: sending, by a display device, pose information representing a predicted pose of a user at a first future time to a split rendering server; receiving, by the display device, an at least partially rendered image for the first future time and data associating the pose information with the at least partially rendered image from the split rendering server; and at a second future time, presenting, by the display device, a rendered image based on the partially rendered image.

In another example, a display device for presenting media data includes: a memory configured to store media data; and a processing system comprising one or more processors implemented in circuitry, the processing system being configured to: send pose information representing a predicted pose of a user at a first future time to a split rendering server; receive an at least partially rendered image for the first future time and data associating the pose information with the at least partially rendered image from the split rendering server; and at a second future time, present a rendered image based on the partially rendered image.

In another example, a method of rendering media data includes: receiving, by a split rendering server, pose information representing a predicted pose of a user at a first future time from a display device; rendering, by the split rendering server, an at least partially rendered image for the first future time according to the predicted pose of the user; and sending, by the split rendering server, the at least partially rendered image and data associating the pose information with the at least partially rendered image to the display device.

In another example, a split rendering server device for rendering media data includes: a memory configured to store media data; and a processing system comprising one or more processors implemented in circuitry, the processing system being configured to: receive pose information representing a predicted pose of a user at a first future time from a display device; render an at least partially rendered image for the first future time according to the predicted pose of the user; and send the at least partially rendered image and data associating the pose information with the at least partially rendered image to the display device.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a flow diagram illustrating an example set of session states and processing operations performed during an XR split session as explained with respect to FIGS. 5 and 6.

FIG. 8 is a block diagram illustrating an example real time protocol (RTP) header extension for sending pose information according to the techniques of this disclosure.

FIG. 10 is a flowchart illustrating an example method of performing split rendering according to techniques of this disclosure.

DETAILED DESCRIPTION

In general, this disclosure describes techniques for performing split rendering of augmented reality (AR) media data or other extended reality (XR) media data, such as mixed reality (MR) or virtual reality (VR). A split rendering server may perform at least part of a rendering process to form rendered images, then stream the rendered images to a display device, such as AR glasses or a head mounted display (HMD). In general, a user may wear the display device, and the display device may capture pose information, such as a user position and orientation/rotation in real world space, which may be translated to render images for a viewport in a virtual world space.

Split rendering may enhance a user experience through providing access to advanced and sophisticated rendering that otherwise may not be possible or may place excess power and/or processing demands on AR glasses or a user equipment (UE) device. In split rendering all or parts of the 3D scene are rendered remotely on an edge application server, also referred to as a "split rendering server" in this disclosure. The results of the split rendering process are streamed down to the UE or AR glasses for display. The spectrum of split rendering operations may be wide, ranging from full pre-rendering on the edge to offloading partial, processing-extensive rendering operations to the edge.

The display device (e.g., UE/AR glasses) may stream pose predictions to the split rendering server at the edge. The display device may then receive rendered media for display from the split rendering server. The XR runtime may be configured to receive rendered data together with associated pose information (e.g., information indicating the predicted pose for which the rendered data was rendered) for proper composition and display. For instance, the XR runtime may need to perform pose correction to modify the rendered data according to an actual pose of the user at the display time. This disclosure describes techniques for conveying render pose information together with rendered images, e.g., in the form of a Real-time Transport Protocol (RTP) header extension. In this manner, the display device can accurately correct and display rendered images when the images were rendered by a separate device, e.g., for split rendering. This may allow advanced rendering techniques to be performed by the split rendering server while also presenting images that accurately reflect a user pose (e.g., position and orientation/rotation) to the user.

Figure 1:
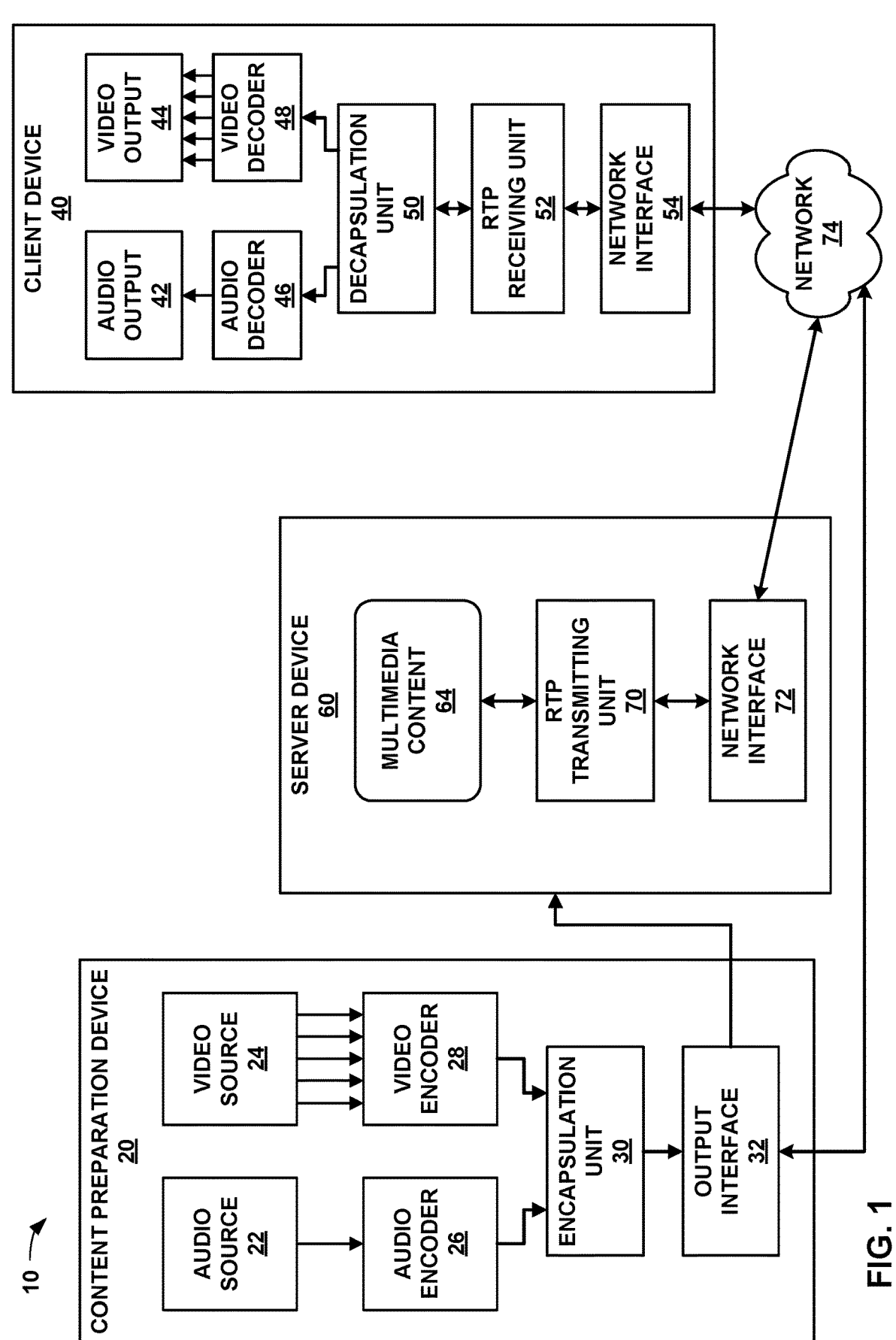
FIG. 1 is a block diagram illustrating an example system that implements techniques for streaming media data over a network.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a media presentation. For example, the coded video or audio part of the media presentation can be an elementary stream. An elementary stream may be converted into a packetized elementary stream (PES) before being encapsulated within a video file. Within the same media presentation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into streamable media data.

Encapsulation unit 30 receives PES packets for elementary streams of a media presentation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Server device 60 includes Real-time Transport Protocol (RTP) transmitting unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64 and include components that conform substantially to those of server device 60. In general, network interface 72 is configured to send and receive data via network 74.

RTP transmitting unit 70 is configured to deliver media data to client device 40 via network 74 according to RTP, which is standardized in Request for Comment (RFC) 3550 by the Internet Engineering Task Force (IETF). RTP transmitting unit 70 may also implement protocols related to RTP, such as RTP Control Protocol (RTCP), Real-time Streaming Protocol (RTSP), Session Initiation Protocol (SIP), and/or Session Description Protocol (SDP). RTP transmitting unit 70 may send media data via network interface 72, which may implement Uniform Datagram Protocol (UDP) and/or Internet protocol (IP). Thus, in some examples, server device 60 may send media data via RTP and RTSP over UDP using network 74.

RTP transmitting unit 70 may receive an RTSP describe request from, e.g., client device 40. The RTSP describe request may include data indicating what types of data are supported by client device 40. RTP transmitting unit 70 may respond to client device 40 with data indicating media streams, such as media content 64, that can be sent to client device 40, along with a corresponding network location identifier, such as a uniform resource locator (URL) or uniform resource name (URN).

RTP transmitting unit 70 may then receive an RTSP setup request from client device 40. The RTSP setup request may generally indicate how a media stream is to be transported. The RTSP setup request may contain the network location identifier for the requested media data (e.g., media content 64) and a transport specifier, such as local ports for receiving RTP data and control data (e.g., RTCP data) on client device 40. RTP transmitting unit 70 may reply to the RTSP setup request with a confirmation and data representing ports of server device 60 by which the RTP data and control data will be sent. RTP transmitting unit 70 may then receive an RTSP play request, to cause the media stream to be "played," i.e., sent to client device 40 via network 74. RTP transmitting unit 70 may also receive an RTSP teardown request to end the streaming session, in response to which, RTP transmitting unit 70 may stop sending media data to client device 40 for the corresponding session.

RTP receiving unit 52, likewise, may initiate a media stream by initially sending an RTSP describe request to server device 60. The RTSP describe request may indicate types of data supported by client device 40. RTP receiving unit 52 may then receive a reply from server device 60 specifying available media streams, such as media content 64, that can be sent to client device 40, along with a corresponding network location identifier, such as a uniform resource locator (URL) or uniform resource name (URN).

RTP receiving unit 52 may then generate an RTSP setup request and send the RTSP setup request to server device 60. As noted above, the RTSP setup request may contain the network location identifier for the requested media data (e.g., media content 64) and a transport specifier, such as local ports for receiving RTP data and control data (e.g., RTCP data) on client device 40. In response, RTP receiving unit 52 may receive a confirmation from server device 60, including ports of server device 60 that server device 60 will use to send media data and control data.

After establishing a media streaming session between server device 60 and client device 40, RTP transmitting unit 70 of server device 60 may send media data (e.g., packets of media data) to client device 40 according to the media streaming session. Server device 60 and client device 40 may exchange control data (e.g., RTCP data) indicating, for example, reception statistics by client device 40, such that server device 60 can perform congestion control or otherwise diagnose and address transmission faults.

Network interface 54 may receive and provide media of a selected media presentation to RTP receiving unit 52, which may in turn provide the media data to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, RTP receiving unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, RTP receiving unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via RTP receiving unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
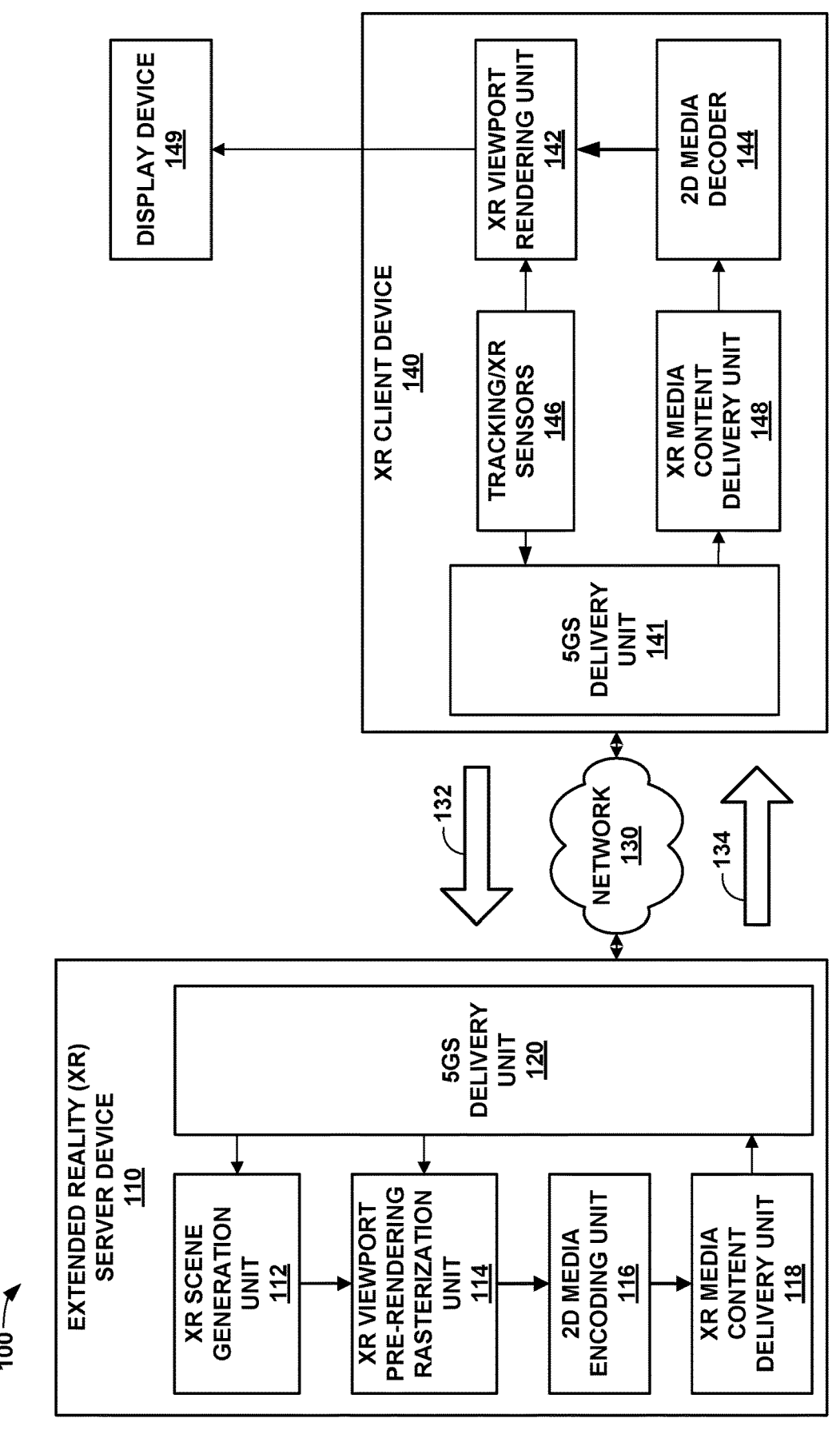
FIG. 2 is a block diagram illustrating an example computing system that may perform split rendering techniques of this disclosure.

FIG. 2 is a block diagram illustrating an example computing system 100 that may perform split rendering techniques of this disclosure. In this example, computing system 100 includes extended reality (XR) server device 110, network 130, XR client device 140, and display device 149. Although shown separately, in some examples, display device 149 may be integrated into XR client device 140. In some examples, display device 149 may perform the rendering functionality attributed to XR client device 140.

XR server device 110 includes XR scene generation unit 112, XR viewport pre-rendering rasterization unit 114, 2D media encoding unit 116, XR media content delivery unit 118, and 5G System (5GS) delivery unit 120. XR client device 140 may correspond to client device 40 of FIG. 1, while XR server device 110 may correspond to server device 60 of FIG. 1.

Network 130 may correspond to any network of computing devices that communicate according to one or more network protocols, such as the Internet. In particular, network 130 may include a 5G radio access network (RAN) including an access device to which XR client device 140 connects to access network 130 and XR server device 110. In other examples, other types of networks, such as other types of RANs, may be used. XR client device 140 includes 5GS delivery unit 141, tracking/XR sensors 146, XR viewport rendering unit 142, 2D media decoder 144, and XR media content delivery unit 148. XR client device 140 also interfaces with display device 149 to present XR media data to a user (not shown).

In some examples, XR scene generation unit 112 may correspond to an interactive media entertainment application, such as a video game, which may be executed by one or more processors implemented in circuitry of XR server device 110. XR viewport pre-rendering rasterization unit 114 may format scene data generated by XR scene generation unit 112 as pre-rendered two-dimensional (2D) media data (e.g., video data) for a viewport of a user of XR client device 140. 2D media encoding unit 116 may encode formatted scene data from XR viewport pre-rendering rasterization unit 114, e.g., using a video encoding standard, such as ITU-T H.264/Advanced Video Coding (AVC), ITU-T H.265/High Efficiency Video Coding (HEVC), ITU-T H.266 Versatile Video Coding (VVC), or the like. XR media content delivery unit 118 represents a content delivery sender, in this example. In this example, XR media content delivery unit 148 represents a content delivery receiver, and 2D media decoder 144 may perform error handling.

In general, XR client device 140 may determine a user's viewport, e.g., a direction in which a user is looking and a physical location of the user, which may correspond to an orientation of XR client device 140 and a geographic position of XR client device 140. Tracking/XR sensors 146 may determine such location and orientation data, e.g., using cameras, accelerometers, magnetometers, gyroscopes, or the like. Tracking/XR sensors 146 provide location and orientation data to XR viewport rendering unit 142 and 5GS delivery unit 141. XR client device 140 provides tracking and sensor information 132 to XR server device 110 via network 130. XR server device 110, in turn, receives tracking and sensor information 132 and provides this information to XR scene generation unit 112 and XR viewport pre-rendering rasterization unit 114. In this manner, XR scene generation unit 112 can generate scene data for the user's viewport and location, and then pre-render 2D media data for the user's viewport using XR viewport pre-rendering rasterization unit 114. XR server device 110 may therefore deliver encoded, pre-rendered 2D media data 134 to XR client device 140 via network 130, e.g., using a 5G radio configuration.

XR scene generation unit 112 may receive data representing a type of multimedia application (e.g., a type of video game), a state of the application, multiple user actions, or the like. XR viewport pre-rendering rasterization unit 114 may format a rasterized video signal. 2D media encoding unit 116 may be configured with a particular 'er/decoder (codec), bitrate for media encoding, a rate control algorithm and corresponding parameters, data for forming slices of pictures of the video data, low latency encoding parameters, error resilience parameters, intra-prediction parameters, or the like. XR media content delivery unit 118 may be configured with real-time transport protocol (RTP) parameters, rate control parameters, error resilience information, and the like. XR media content delivery unit 148 may be configured with feedback parameters, error concealment algorithms and parameters, post correction algorithms and parameters, and the like.

Raster-based split rendering refers to the case where XR server device 110 runs an XR engine (e.g., XR scene generation unit 112) to generate an XR scene based on information coming from an XR device, e.g., XR client device 140 and tracking and sensor information 132. XR server device 110 may rasterize an XR viewport and perform XR pre-rendering using XR viewport pre-rendering rasterization unit 114.

In the example of FIG. 2, the viewport is predominantly rendered in XR server device 110, but XR client device 140 is able to do latest pose correction, for example, using asynchronous time-warping or other XR pose correction to address changes in the pose. XR graphics workload may be split into rendering workload on a powerful XR server device 110 (in the cloud or the edge) and pose correction (such as asynchronous timewarp (ATW)) on XR client device 140. Low motion-to-photon latency is preserved via on-device Asynchronous Time Warping (ATW) or other pose correction methods performed by XR client device 140.

In some examples, latency from rendering video data by XR server device 110 and XR client device 140 receiving such pre-rendered video data may be in the range of 50 milliseconds (ms). Latency for XR client device 140 to provide location and position (e.g., pose) information may be lower, e.g., 20 ms, but XR server device 110 may perform asynchronous time warp to compensate for the latest pose in XR client device 140.

The following call flow is an example highlighting steps of performing these techniques:

1) XR client device 140 connects to network 130 and joins an XR application (e.g., executed by XR scene generation unit 112).
   a) XR client device 140 sends static device information and capabilities (supported decoders, viewport).
2) Based on this information, XR server device 110 sets up encoders and formats.
3) Loop:
   a) XR client device 140 collects XR pose (or a predicted XR pose) using tracking/XR sensors 146.
   b) XR client device 140 sends XR pose information, in the form of tracking and sensor information 132, to XR server device 110.
   c) XR server device 110 uses tracking and sensor information 132 to pre-render an XR viewport via XR scene generation unit 112 and XR viewport pre-rendering rasterization unit 114.
   d) 2D media encoding unit 116 encodes the XR viewport.
   e) XR media content delivery unit 118 and 5GS delivery unit 120 send the compressed media to XR client device 140, along with data representing the XR pose that the viewport was rendered for.
   f) XR client device 140 decompresses the video data using 2D media decoder 144.
   g) XR client device 140 uses the XR pose data provided with the video frame and the actual XR pose from tracking/XR sensors 146 for an improved prediction and to correct the local pose, e.g., using ATW performed by XR viewport rendering unit 142.

The roundtrip interaction delay is therefore the sum of the Age of Content and the User Interaction Delay. If part of the rendering is done on an XR server and the service produces a frame buffer as a rendering result of the state of the content, then for raster-based split rendering in cloud gaming applications, the following processes contribute to such a delay:

User Interaction Delay (Pose and other interactions)
   capture of user interaction in game client,
   delivery of user interaction to the game engine, i.e., to the server (aka network delay),
   processing of user interaction by the game engine/server, Age of Content
   creation of one or several video buffers (e.g., one for each eye) by the game engine/server,
   encoding of the video buffers into a video stream frame,
   delivery of the video frame to the game client (a.k.a. network delay),
   decoding of the video frame by the game client,
   presentation of the video frame to the user (a.k.a. framerate delay).

As XR client device 140 applies ATW, the motion-to-photon latency requirements (of at most 20 ms) are met by internal processing of XR client device 140. What determines the network requirements for split rendering is time of pose-to-render-to-photon and the roundtrip interaction delay. According to TR 26.928, clause 4.5, the permitted downlink latency is typically 50-60 ms.

The various components of XR server device 110, XR client device 140, and display device 149 may be implemented using one or more processors implemented in circuitry, such as one or more digital signal processors (DSPs), general purpose microprocessors, application specific integrated circuits (ASICs), field programmable logic arrays (FPGAs), or other equivalent integrated or discrete logic circuitry. The functions attributed to these various components may be implemented in hardware, software, or firmware. When implemented in software or firmware, it should be understood that instructions for the software or firmware may be stored on a computer-readable medium and executed by requisite hardware.

In this manner, XR client device 140 represents an example of a display device for presenting media data including: a memory configured to store media data; and a processing system comprising one or more processors implemented in circuitry, the processing system being configured to: send pose information representing a predicted pose of a user at a first future time to a split rendering server; receive an at least partially rendered image for the first future time and data associating the pose information with the at least partially rendered image from the split rendering server; and at a second future time, present a rendered image based on the partially rendered image.

Likewise, XR server device 110 represents an example of a split rendering server device for rendering media data including: a memory configured to store media data; and a processing system comprising one or more processors implemented in circuitry, the processing system being configured to: receive pose information representing a predicted pose of a user at a first future time from a display device; render an at least partially rendered image for the first future time according to the predicted pose of the user; and send the at least partially rendered image and data associating the pose information with the at least partially rendered image to the display device.

Figure 3:
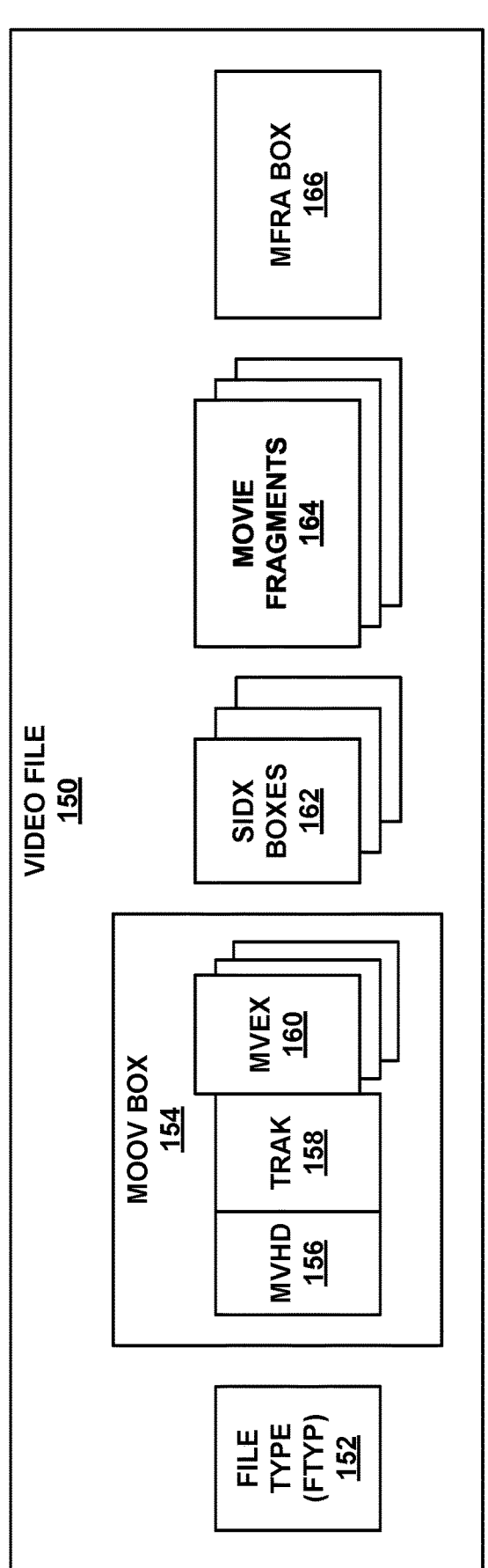
FIG. 3 is a block diagram illustrating elements of an example video file.

FIG. 3 is a block diagram illustrating elements of an example video file 150. As described above, video files in accordance with the ISO base media file format and extensions thereof store data in a series of objects, referred to as "boxes." In the example of FIG. 3, video file 150 includes file type (FTYP) box 152, movie (MOOV) box 154, segment index (sidx) boxes 162, movie fragment (MOOF) boxes 164, and movie fragment random access (MFRA) box 166. Although FIG. 3 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

MOOV box 154, in the example of FIG. 3, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments of MOOF boxes 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments of MOOF boxes 164, e.g., to signal that video file 150 includes movie fragments of MOOF boxes 164, in addition to video data included within MOOV box 154, if any. In the context of streaming video data, coded video pictures may be included in movie fragments of MOOF boxes 164 rather than in MOOV box 154. Accordingly, all coded video samples may be included in movie fragments of MOOF boxes 164, rather than in MOOV box 154.

MOOV box 154 may include a number of MVEX boxes 160 equal to the number of movie fragments of MOOF boxes 164 in video file 150. Each of MVEX boxes 160 may describe characteristics of a corresponding one of movie fragments of MOOF boxes 164. For example, each MVEX box may include a movie extends header box (MEHD) box that describes a temporal duration for the corresponding one of movie fragments of MOOF boxes 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments of MOOF boxes 164. Encapsulation unit 30 may further signal the presence of a sequence data set and/or sequence level SEI messages as being present in one of movie fragments of MOOF boxes 164 within the one of MVEX boxes 160 corresponding to the one of movie fragments of MOOF boxes 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file

150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments of MOOF boxes 164 may include one or more coded video pictures. In some examples, movie fragments of MOOF boxes 164 may include one or more groups of pictures (GOPs), each of which may include a number of coded video pictures, e.g., frames or pictures. In addition, as described above, movie fragments of MOOF boxes 164 may include sequence data sets in some examples. Each of movie fragments of MOOF boxes 164 may include a movie fragment header box (MFHD, not shown in FIG. 3). The MFHD box may describe characteristics of the corresponding movie fragment, such as a sequence number for the movie fragment. Movie fragments of MOOF boxes 164 may be included in order of sequence number in video file 150.

MFRA box 166 may describe random access points within movie fragments of MOOF boxes 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments of MOOF boxes 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 4:
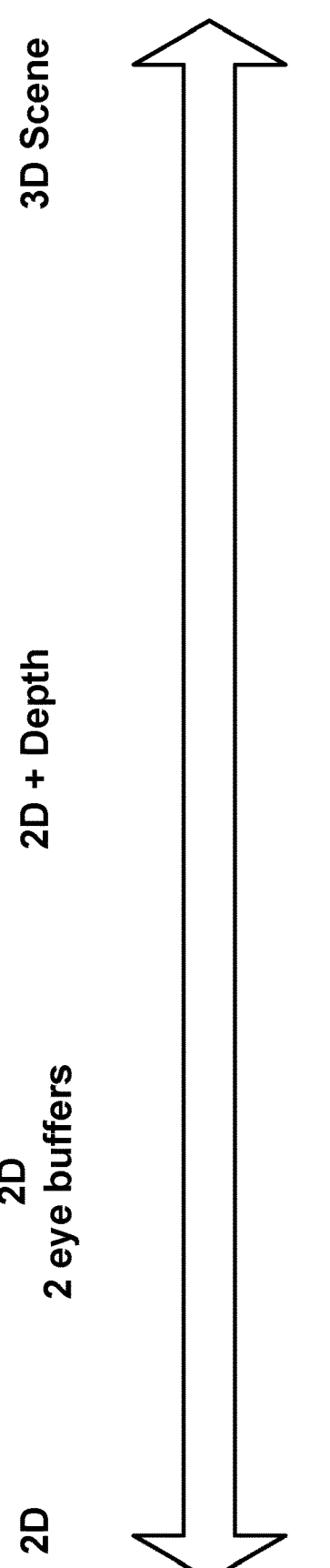
FIG. 4 is a conceptual diagram illustrating an example spectrum of a variety of split rendering configurations.

FIG. 4 is a conceptual diagram illustrating an example spectrum of a variety of split rendering configurations. On the left side of the spectrum, an edge application server (e.g., server device 60 of FIG. 1 or XR server device 110 of FIG. 2) would produce a single 2D video rendering of the visual scene. Depending on the configuration of the UE (e.g., client device 40 of FIG. 1 or XR client device 140 of FIG. 2), a rendering to two eye buffers with the appropriate projection may be needed. Other supporting streams, such as depth or transparency may be added too.

Partial offloading would delegate some rendering operations to the edge application server, while still receiving a 3D scene at the UE. An example of partial offloading is to offload light baking of the scene textures to the edge, which may be performed with techniques like ray tracing. Thus, ray tracing or other resource intensive rendering techniques may be performed by a split rendering server (e.g., an edge application server), then the split rendering server may stream at least partially rendered images to a display device.

Figure 5:
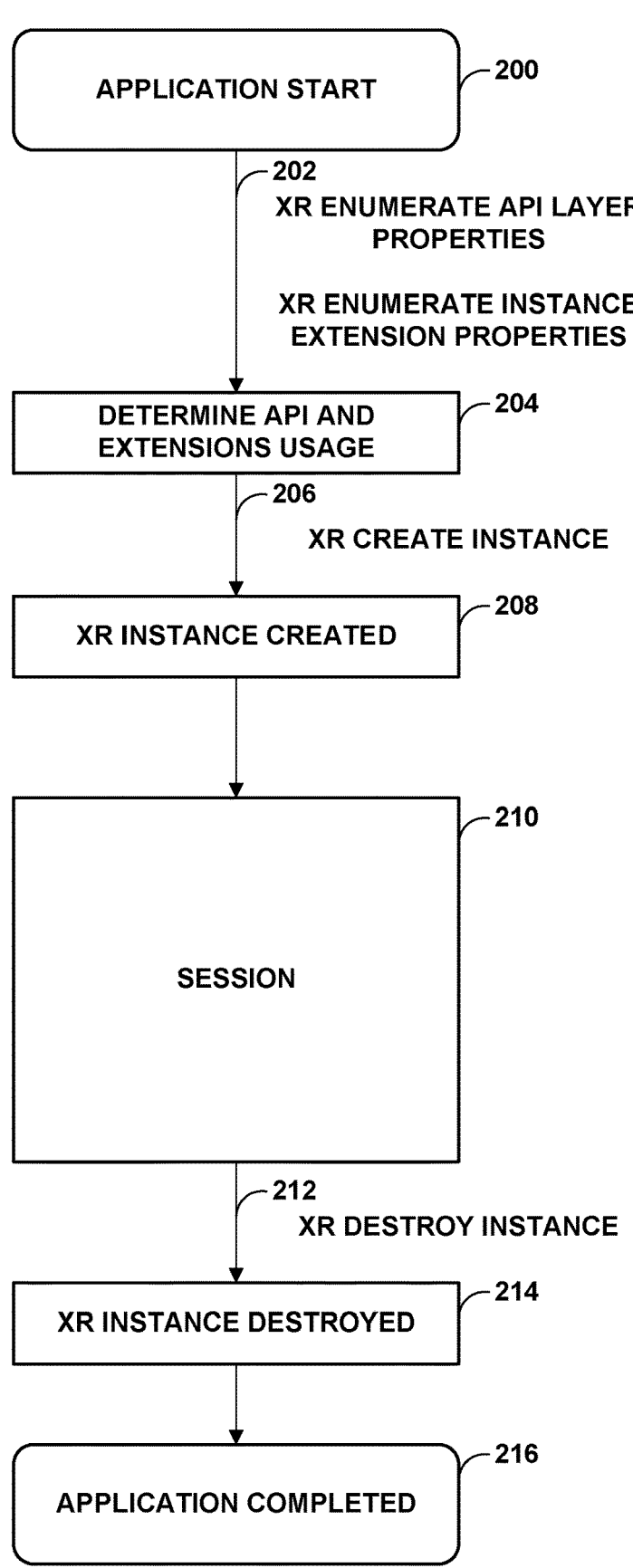
FIG. 5 is a flow diagram illustrating an example process for creating and destroying an extended reality (XR) split rendering session between a rendering server and a display device, such as a head mounted display (HMD).

FIG. 5 is a flow diagram illustrating an example process for creating and destroying an extended reality (XR) split rendering session between a split rendering server and a display device, such as a head mounted display (HMD). Augmented reality (AR) data may be formatted according to OpenXR. OpenXR is an API developed by the Khronos Group for developing XR applications that addresses a wide range of XR devices. XR refers to a mix of real and virtual world environments that are generated by computers through interactions by humans. XR includes technologies such as virtual reality (VR), augmented reality (AR), and mixed reality (MR). OpenXR acts as an interface between an application and an XR runtime. The XR runtime handles functionality such as frame composition, user-triggered actions, and tracking information.

OpenXR is designed to be a layered API, which means that a user or application may insert API layers between the application and the runtime implementation. These API layers provide additional functionality by intercepting OpenXR functions from the layer above and then performing different operations than would otherwise be performed without the layer. In the simplest cases, one layer simply calls the next layer down with the same arguments, but a more complex layer may implement API functionality that is not present in the layers or runtime below it. This mechanism is essentially an architected "function shimming" or "intercept" feature that is designed into OpenXR and meant to replace more informal methods of "hooking" API calls.

Initially, an XR application may start (200) and determine API layers that are available by calling an xrEnumerateApiLayerProperties function (202) of OpenXR to obtain a list of available API layers. The XR application may then select the desired API layers from this list (204) and provide the selected API layers to an xrCreateInstance function when creating an instance (206).

API layers may implement OpenXR functions that may or may not be supported by the underlying runtime. In order to expose these new features, the API layer must expose this functionality in the form of an OpenXR extension. The API layer must not expose new OpenXR functions without an associated extension. This may result in the OpenXR instance being created (208).

The XR application may then perform an XR session (210), during which media data may be received and presented to a user. An HMD or other device may track the user's position and orientation and generate pose information representing the position and orientation. Based on a current position and orientation, as well as velocity and rotation, the HMD may attempt to predict the position of the user at a future time. The HMD may send data representing a prediction of the user's future position and orientation to a split rendering server. The split rendering server may then at least partially render one or more images based on the prediction. The split rendering server may then send the at least partially rendered images to the HMD, along with information indicating the pose (position and orientation) for which the images were rendered. The HMD may then determine an actual pose and modify the received images according to differences between the predicted pose and the actual pose, then present the images to the user.

An OpenXR instance is an object that allows an OpenXR application to communicate with an OpenXR runtime. The application accomplishes this communication by calling xrCreateInstance and receiving a handle to the resulting XrInstance object.

The XrInstance object stores and tracks OpenXR-related application state, without storing any such state in the application's global address space. This allows the application to create multiple instances as well as safely encapsulate the application's OpenXR state, since this object is opaque to the application. OpenXR runtimes may limit the number of simultaneous XrInstance objects that may be created and used, but they must support the creation and usage of at least one XrInstance object per process.

Spaces are represented by XrSpace handles, which the XR application creates and then uses in API calls. Whenever an XR application calls a function that returns coordinates, the XR application provides an XrSpace to specify the frame of reference in which those coordinates will be expressed. Similarly, when providing coordinates to a function, the application specifies which XrSpace the runtime to be used to interpret those coordinates.

OpenXR defines a set of well-known reference spaces that applications use to bootstrap their spatial reasoning. These reference spaces are: VIEW, LOCAL and STAGE. Each reference space has a well-defined meaning, which establishes where its origin is positioned and how its axes are oriented.

Runtimes whose tracking systems improve their understanding of the world over time may track spaces independently. For example, even though a LOCAL space and a STAGE space each map their origin to a static position in the world, a runtime with an inside-out tracking system may introduce slight adjustments to the origin of each space on a continuous basis to keep each origin in place.

Beyond these reference spaces, runtimes may expose other independently tracked spaces, such as a pose action space that tracks the pose of a motion controller over time.

Once the XR session has ended, the XR application may destroy the XR instance (212), resulting in the XR instance being destroyed (214), and the XR application may then be completed (216).

Figure 6:
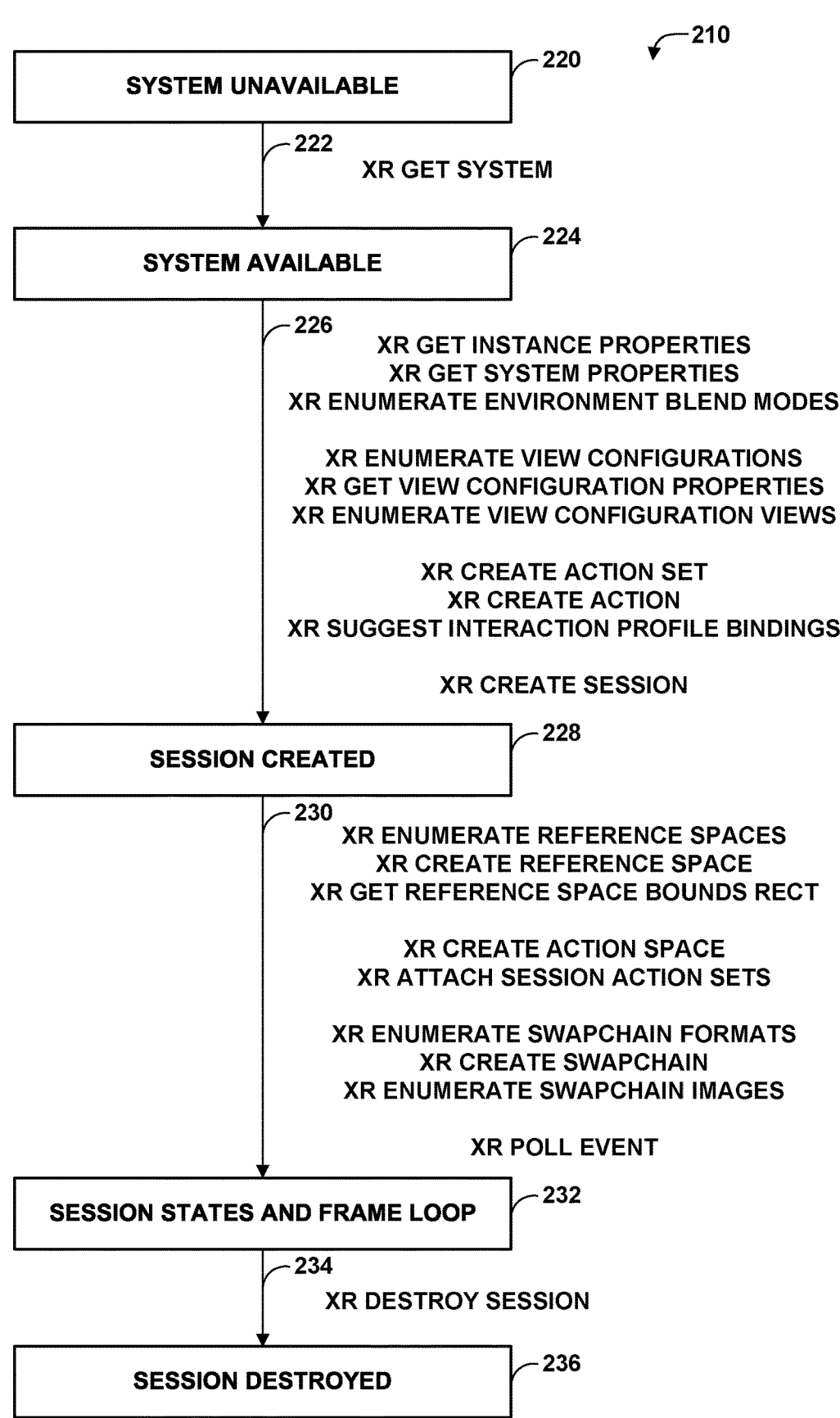
FIG. 6 is a flow diagram illustrating an example process performed during an XR split rendering session as explained with respect to FIG. 5.

FIG. 6 is a flow diagram illustrating an example process performed during an XR split rendering session as explained with respect to FIG. 5. Initially, the system is unavailable (220). The XR application calls XR get system (222), and the system becomes available (224). The XR application may then perform a variety of calls to create the session (226), including obtaining instance properties, system properties, and enumerating environment blend modes, and enumerating view configurations using view configuration properties and enumerated view configuration views. The XR application may then create an action set and an action (e.g., when a user moves or turns) and suggests interaction profile blending. The session may then be created (228).

After the session is created, the XR application may enumerate reference spaces, create a reference space, get the reference space bounding rectangle, create an action space, attach session action sets, enumerate swapchain formats, create swapchains, enumerate swapchain events, and create a poll event (230). The session may then traverse various session states and enter a frame loop (232) as explained with respect to FIG. 7 below. Once the session is terminated (234), the XR application may destroy the session (236).

FIG. 7 is a flow diagram illustrating an example set of session states and processing operations performed during an XR split session as explained with respect to FIGS. 5 and 6. Initially, an XR session may begin in an XR session state idle (240), then transition to XR session state ready (242). During the ready state, method 250 may be performed as explained below. The state may then transition back to XR session state idle if the session is continuing, or to XR session state stopping (244) if the session is to be terminated. In the stopping state, the XR application may tear down communication sessions for the XR session, then transition to XR session state exiting (246). Alternatively, if there is loss, the XR session state loss pending (248) may also terminate the session.

In method 250, an XR application calls the XR wait frame function to wait for the opportunity to display the next frame. Once the call returns, it informs the XR runtime that it is to start rendering swapchain images by calling the xrBeginFrame (252). The XR application calls the xrAcquireSwapchainImage or the xrWaitSwapchinImage (254) to get exclusive access to the swapchain images for rendering. The XR application then uses a graphics engine of its choice, such as Vulkan or OpenGL, to render the scene (256). Once done, the XR application releases the swapchain images by calling the xrReleaseSwapchainImage (258) and passing the rendered frame to the XR runtime through a call to xrEndFrame (260).

For split rendering, the graphics work of step 256 is performed completely or partially in the edge application server. Instead of sending the current pose and waiting for a response from the edge, the XR application would send a predicted pose some time in the future and render the frame that was last received from the edge. The XR application would then receive a rendered image for the predicted pose from the edge application server, along with data representing the predicted pose.

FIG. 8 is a block diagram illustrating an example real time protocol (RTP) header extension 280 for sending pose information according to the techniques of this disclosure. The RTP header extension of FIG. 8 represents an example of data that may be used to indicate a predicted pose for which a split rendering device (e.g., an edge application server) rendered an image.

The split rendering server may stream rendered frames using one or more video streams, depending on the view and projection configuration that is selected by the UE. The split rendering server may use RTP header extension 280 to associate the selected pose with the rendered frame. RTP header extension 280 may thereby associate the rendered frame with the predicted pose for which the rendered frame was rendered, as RTP header extension 280 may be carried as part of RTP packets that carry the rendered images of a frame. RTP header extension 280 may also be used with audio streams of a split rendering process.

Header extensions are declared in session description protocol (SDP) using the "a=extmap" attribute as defined in RFC8285. A header extension may be identified through an association between a uniform resource indicator (URI) of the header extension and an ID value that is contained as part of the extension. The rendered pose header extension may use the following uniform resource name (URN): "urn:3gpp:xr-rendered-pose."

Additionally or alternatively, the RTP header extension of FIG. 8 may also represent an example of data that may be sent by an XR client device to an XR server device to indicate a predicted pose at a particular time.

In the example of FIG. 8, RTP header extension 280 includes a two byte header format for signaling a pose for which a frame was rendered. 0xBE field 282 and 0xDE field 284 include hexadecimal values 0xBE (a decimal value of 190) and 0xDE (a decimal value of 222) respectively. Length field 286 may have a value of "1." ID field 288 may have a value of "1." Length field 290 may have a decimal value of "48."

RTP header extension 280 further includes X field 292, Y field 294, Z field 296, RX field 298, RY field 300, RZ field 302, RW field 304, timestamp field 306, action ID field 308, and extra field 310. X field 292, Y field 294, and Z field 296 together define a predicted position of a user at the time indicated by the value of timestamp field 306, e.g., as an XrVector3 value. RX field 298, RY field 300, RZ field 302, and RW field 304 together define a predicted orientation/rotation of the user at the time indicated by the value of timestamp field 306, e.g., as an XrQuaternion value. Timestamp field 306 has a value corresponding to the time for which the pose was predicted.

Alternatively to this format, the XR application and the rendering server may use unique identifiers for the transmitted pose information to reduce the required extension header size.

The header may also provide identifiers for all actions that were processed for the rendering of the frame in action ID #1 field 308 and extra field 310, where extra field 310 may include a plurality of 16-bit fields, each for an additional action.

XR client device 140 may execute the XR application and include a memory including a buffer for storing rendered frames received from XR server device 110. XR client device 140 may store the rendered frames in the buffer while waiting for a next display opportunity as a response to an xrWaitFrame call, as explained with respect to step 252 of FIG. 7 above. XR client device 140 may store the rendered pose and actions together with the rendered frame. Upon receiving the predicted timestamp for the next display frame, the XR application may check the buffer for a buffer frame that minimizes the gap between the display time and the frame timestamp. The XR application may also choose a frame that reflects the latest actions that were taken by the user.

Figure 9:
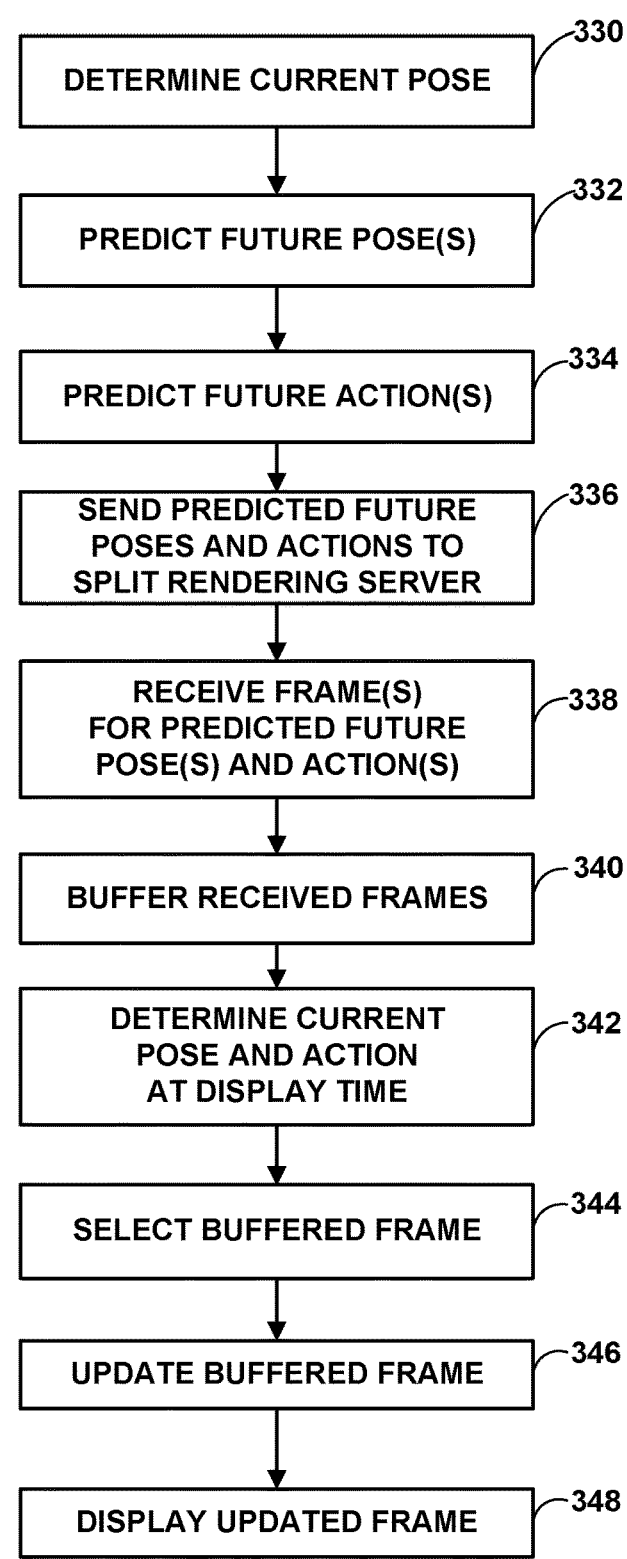
FIG. 9 is a flowchart illustrating an example method that may be performed by an XR client device according to the techniques of this disclosure.

FIG. 9 is a flowchart illustrating an example method that may be performed by an XR client device according to the techniques of this disclosure. The method of FIG. 9 may be performed by, e.g., client device 40 of FIG. 1 or XR client device 140 of FIG. 2 during an XR split rendering session.

Initially, XR client device 140, for example, may determine a current pose of a user (330). For example, XR client device 140 may use various sensors, such as cameras, gyroscopes, accelerometers, or the like, to determine a current pose of the user. The pose may include a position in three-dimensional space (X, Y, and Z values) as well as an orientation (e.g., a Quaternion or Euler angle rotation). XR client device 140 may also determine velocity of movement and rotation of the user. XR client device 140 may then predict one or more future poses (332) and predict one or more future actions (334) taken by the user. The actions may include, for example, button presses, joystick movements, hand movements, or other interactions with controller devices or the like, separate from movement by the user.

XR client device 140 may then send data representative of the predicted future pose(s) and action(s) to a split rendering server (336), such as XR server device 110 of FIG. 2. In response, XR client device 140 may receive one or more frames for the predicted future poses and actions (338). In particular, the received frames may include data representing a predicted pose for which the frames were rendered, as well as one or more predicted actions for which the frames were rendered. In some examples, only a single frame may be predicted for a particular time, whereas in other examples, XR server device 110 may predict multiple frames for a particular time, each corresponding to a different combination of pose and action. XR client device 140 may buffer the received frames (340).

At a time to display a frame to the user, e.g., as indicated by the XR wait time and XR begin frame functions, XR client device 140 may determine a current pose and action of the user at the display time (342). XR client device 140 may then select one of the buffered frames (344) that most closely resembles the current pose and action of the user and having a timestamp that is closest to the display time. The differences between pose, action, and timestamp may act as various inputs into a frame selection method, and may be equally valued or combined using various weighting schemes. Ultimately, XR client device 140 may update the buffered frame based on the current pose, action, and display time (346) and display the updated frame (348).

FIG. 10 is a flowchart illustrating an example method of performing split rendering according to techniques of this disclosure. The method of FIG. 10 is performed by a split rendering client device, such as client device 40 of FIG. 1 or XR client device 140 of FIG. 2, and a split rendering server device, such as content preparation device 20 of FIG. 1 or XR server device 110 of FIG. 2.

Initially, the split rendering client device creates an XR split rendering session (400). Creating the XR split rendering session may include any or all of steps 200-208 of FIG. 5, and/or steps 220 and 224 of FIG. 6. As discussed above, creating the XR split rendering session may include, for example, sending device information and capabilities, such as supported decoders, viewport information (e.g., resolution, size, etc.), or the like. The split rendering server device sets up an XR split rendering session (402), which may include setting up encoders corresponding to the decoders and renderers corresponding to the viewport supported by the split rendering client device.

The split rendering client device may then receive current pose and action information (404). For example, the split rendering client device may collect XR pose and movement information from tracking/XR sensors (e.g., tracking/XR sensors 146 of FIG. 2). The split rendering client device may then predict a user pose (e.g., position and orientation) at a future time (406). The split rendering client device may predict the user pose according to a current position and orientation, velocity, and/or angular velocity of the user/a head mounted display (HMD) worn by the user. The predicted pose may include a position in an XR scene, which may be represented as an {X, Y, Z} triplet value, and an orientation/rotation, which may be represented as an {RX, RY, RZ, RW} quaternion value. The split rendering client device may send the predicted pose information, (optionally) along with any actions performed by the user to the split rendering server device (408. For example, the split rendering client device may form a message according to the format shown in FIG. 8 to indicate the position, rotation, timestamp (indicative of a time for which the pose information was predicted), and optional action information, and send the message to the split rendering server device.

The split rendering server device may receive the predicted pose information (410) from the split rendering client device. The split rendering server device may then render a frame for the future time based on the predicted pose at that future time (412). For example, the split rendering server device may execute a game engine that uses the predicted pose at the future time to render an image for the corresponding viewport, e.g., based on positions of virtual objects in the XR scene relative to the position and orientation of the user's pose at the future time. The split rendering server device may then send the rendered frame to the split rendering client device (414).

The split rendering client device may then receive the rendered frame (416) and present the rendered frame at the future time (418). For example, the split rendering client device may receive a stream of rendered frames and store the received rendered frames to a frame buffer. At a current display time, the split rendering client device may determine the current display time and then retrieve one of the rendered frames from the buffer having a presentation time that is closest to the current display time.

In this manner, the method of FIG. 10 represents an example of a method of presenting media data, including sending, by a display device, pose information representing a predicted pose of a user at a first future time to a split rendering server; receiving, by the display device, an at least partially rendered image for the first future time and data associating the pose information with the at least partially rendered image from the split rendering server; and at a second future time, presenting, by the display device, a rendered image based on the partially rendered image.

The method of FIG. 10 also represents an example of a method of rendering media data, including receiving, by a split rendering server, pose information representing a predicted pose of a user at a first future time from a display device; rendering, by the split rendering server, an at least partially rendered image for the first future time according to the predicted pose of the user; and sending, by the split rendering server, the at least partially rendered image and data associating the pose information with the at least partially rendered image to the display device.

Figure 11:
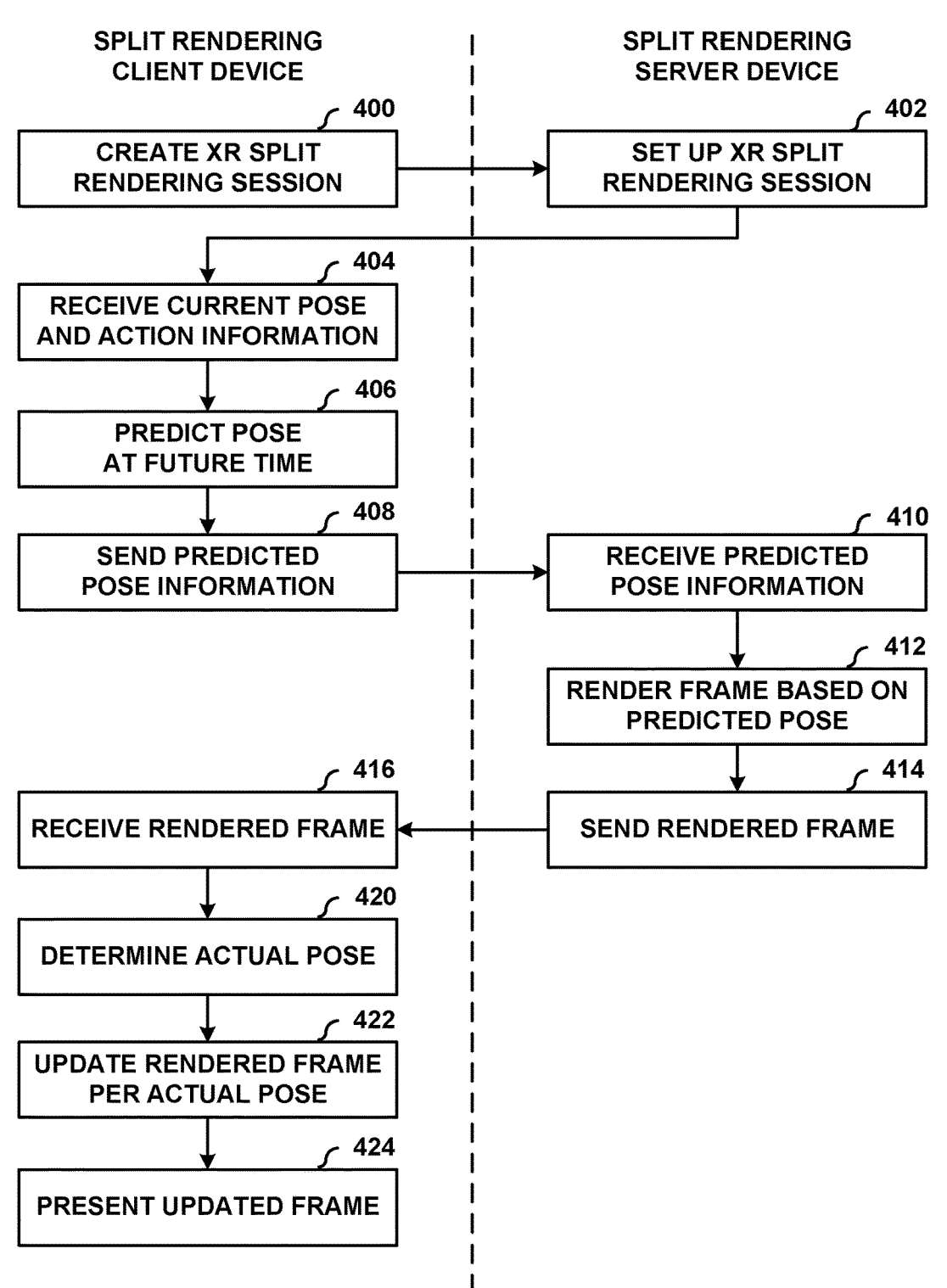
FIG. 11 is a flowchart illustrating another example method of performing split rendering according to techniques of this disclosure.

FIG. 11 is a flowchart illustrating another example method of performing split rendering according to techniques of this disclosure. The method of FIG. 11 is essentially the same as the method of FIG. 10 until after step 416. In the example of FIG. 11, after the split rendering client device receives a rendered frame for a future time (416), the spit rendering client device, at the future time, determines an actual pose of the user (420). The split rendering client device then updates the rendered frame per the actual pose (422) and presents the updated frame (424). Updating the rendered frame may include, for example, warping positions and/or rotations of virtual objects in the frame, rendering data for objects that were estimated to have been occluded, occluding objects that were estimated to have been visible, or the like.

In this manner, the method of FIG. 11 represents an example of a method of presenting media data, including sending, by a display device, pose information representing a predicted pose of a user at a first future time to a split rendering server; receiving, by the display device, an at least partially rendered image for the first future time and data associating the pose information with the at least partially rendered image from the split rendering server; and at a second future time, presenting, by the display device, a rendered image based on the partially rendered image.

The method of FIG. 11 also represents an example of a method of rendering media data, including receiving, by a split rendering server, pose information representing a predicted pose of a user at a first future time from a display device; rendering, by the split rendering server, an at least partially rendered image for the first future time according to the predicted pose of the user; and sending, by the split rendering server, the at least partially rendered image and data associating the pose information with the at least partially rendered image to the display device.

Various examples of the techniques of this disclosure are summarized in the following clauses:

Clause 1. A method of presenting media data, the method comprising: sending, by a device, pose information representing a predicted pose of a user at a first future time to a split rendering server; receiving, by the device, an at least partially rendered image for the first future time and data associating the pose information with the at least partially rendered image from the split rendering server; and at a second future time, outputting for presentation, by the device to a display device, a rendered image based on the partially rendered image.

Clause 2. The method of clause 1, wherein receiving the data associating the pose information with the at least partially rendered image comprises receiving a Real-time Transport Protocol (RTP) header extension including data representative of the pose information.

Clause 3. The method of clause 2, wherein the RTP header extension includes an X value, a Y value, and a Z value defining a position; an RX value, an RY value, an RZ value, and an RW value defining a rotation; and a timestamp value indicating the first future time.

Clause 4. The method of any of clauses 1-3, further comprising: sending a predicted action of the user to the split rendering server; and receiving data associating the predicted action with the at least partially rendered image.

Clause 5. The method of any of clauses 1-4, further comprising: determining an actual pose of the user at the second future time; and updating the at least partially rendered image based on a difference between the predicted pose and the actual pose to form the rendered image.

Clause 6. The method of any of clauses 1-5, wherein the second future time is equal to the first future time.

Clause 7. The method of any of clauses 1-5, wherein receiving the at least partially rendered image comprises receiving a plurality of at least partially rendered images including the at least partially rendered image, each of the plurality of at least partially rendered images being associated with different future times, the method further comprising: selecting the at least partially rendered image when the first future time, among the different future times, is closest to the second future time.

Clause 8. The method of clause 1, further comprising: sending a predicted action of the user to the split rendering server; and receiving data associating the predicted action with the at least partially rendered image.

Clause 9. The method of clause 1, further comprising: determining an actual pose of the user at the second future time; and updating the at least partially rendered image based on a difference between the predicted pose and the actual pose to form the rendered image.

Clause 10. The method of clause 1, wherein the second future time is equal to the first future time.

Clause 11. The method of clause 1, wherein receiving the at least partially rendered image comprises receiving a plurality of at least partially rendered images including the at least partially rendered image, each of the plurality of at least partially rendered images being associated with different future times, the method further comprising: selecting the at least partially rendered image when the first future time, among the different future times, is closest to the second future time.

Clause 12. A method of rendering media data, the method comprising: receiving, by a split rendering server, pose information representing a predicted pose of a user at a first future time from a device; rendering, by the split rendering server, an at least partially rendered image for the first future time; and sending, by the split rendering server, the at least partially rendered image and data associating the pose information with the at least partially rendered image to the device.

Clause 13. The method of clause 12, wherein sending the data associating the pose information with the at least partially rendered image comprises sending a Real-time Transport Protocol (RTP) header extension including data representative of the pose information.

Clause 14. The method of clause 13, wherein the RTP header extension includes an X value, a Y value, and a Z value defining a position; an RX value, an RY value, an RZ value, and an RW value defining a rotation; and a timestamp value indicating the first future time.

Clause 15. The method of any of clauses 12-14, further comprising: receiving a predicted action of the user from the device; and sending data associating the predicted action with the at least partially rendered image to the device.

Clause 16. The method of any of clauses 12, further comprising: receiving a predicted action of the user from the device; and sending data associating the predicted action with the at least partially rendered image to the device.

Clause 17. A device for processing media data, the device comprising one or more means for performing the method of any of clauses 1-16.

Clause 18. The device of clause 17, wherein the one or more means comprise a memory for storing media data and one or more processors implemented in circuitry.

Clause 19. A device for presenting media data, the device comprising: means for sending pose information representing a predicted pose of a user at a first future time to a split rendering server; means for receiving an at least partially rendered image for the first future time and data associating the pose information with the at least partially rendered image from the split rendering server; and means for presenting, at a second future time, a rendered image based on the partially rendered image.

Clause 20. A split rendering device for rendering media data, the split rendering device comprising: means for receiving pose information representing a predicted pose of a user at a first future time from a device; means for rendering an at least partially rendered image for the first future time; and means for sending the at least partially rendered image and data associating the pose information with the at least partially rendered image to the device.

Clause 21. A method of presenting media data, the method comprising: sending, by a device, pose information representing a predicted pose of a user at a first future time to a split rendering server; receiving, by the device, an at least partially rendered image for the first future time and data associating the pose information with the at least partially rendered image from the split rendering server; and at a second future time, outputting for presentation, by the device and to a display device, a rendered image based on the partially rendered image.

Clause 22. The method of clause 21, wherein receiving the data associating the pose information with the at least partially rendered image comprises receiving a Real-time Transport Protocol (RTP) header extension including data representative of the pose information.

Clause 23. The method of clause 21, wherein the pose information representing the predicted pose of the user at the first future time includes an X value, a Y value, and a Z value defining a position; an RX value, an RY value, an RZ value, and an RW value defining a rotation; and a timestamp value indicating the first future time.

Clause 24. The method of clause 21, further comprising: sending a predicted action of the user to the split rendering server; and receiving data associating the predicted action with the at least partially rendered image.

Clause 25. The method of clause 21, further comprising: determining an actual pose of the user at the second future time; and updating the at least partially rendered image based on a difference between the predicted pose and the actual pose to form the rendered image.

Clause 26. The method of clause 21, wherein the second future time is equal to the first future time.

Clause 27. The method of clause 21, wherein receiving the at least partially rendered image comprises receiving a plurality of at least partially rendered images including the at least partially rendered image, each of the plurality of at least partially rendered images being associated with different future times, the method further comprising: selecting the at least partially rendered image when the first future time, among the different future times, is closest to the second future time.

Clause 28. A device for presenting media data, the device comprising: a memory configured to store media data; and a processing system comprising one or more processors implemented in circuitry, the processing system being configured to: send pose information representing a predicted pose of a user at a first future time to a split rendering server; receive an at least partially rendered image for the first future time and data associating the pose information with the at least partially rendered image from the split rendering server; and at a second future time, present a rendered image based on the partially rendered image.

Clause 29. The device of clause 28, wherein to receive the data associating the pose information with the at least partially rendered image, the processing system is configured to receive a Real-time Transport Protocol (RTP) header extension including data representative of the pose information.

Clause 30. The device of clause 28, wherein the pose information representing the predicted pose of the user at the first future time includes an X value, a Y value, and a Z value defining a position; an RX value, an RY value, an RZ value, and an RW value defining a rotation; and a timestamp value indicating the first future time.

Clause 31. The device of clause 28, wherein the processing system is further configured to: send a predicted action of the user to the split rendering server; and receive data associating the predicted action with the at least partially rendered image.

Clause 32. The device of clause 28, wherein the processing system is further configured to: determine an actual pose of the user at the second future time; and update the at least partially rendered image based on a difference between the predicted pose and the actual pose to form the rendered image.

Clause 33. The device of clause 28, wherein the second future time is equal to the first future time.

Clause 34. The device of clause 28, wherein to receive the at least partially rendered image, the processing system is configured to receive a plurality of at least partially rendered images including the at least partially rendered image, each of the plurality of at least partially rendered images being associated with different future times, and wherein the processing system is further configured to select the at least partially rendered image when the first future time, among the different future times, is closest to the second future time.

Clause 35. A method of rendering media data, the method comprising: receiving, by a split rendering server, pose information representing a predicted pose of a user at a first future time from a device; rendering, by the split rendering server, an at least partially rendered image for the first future time according to the predicted pose of the user; and sending, by the split rendering server, the at least partially rendered image and data associating the pose information with the at least partially rendered image to the device.

Clause 36. The method of clause 35, wherein sending the data associating the pose information with the at least partially rendered image comprises sending a Real-time Transport Protocol (RTP) header extension including data representative of the pose information.

Clause 37. The method of clause 35, wherein the pose information includes an X value, a Y value, and a Z value defining a position; an RX value, an RY value, an RZ value, and an RW value defining a rotation; and a timestamp value indicating the first future time.

Clause 38. The method of clause 35, further comprising: receiving a predicted action of the user from the device; and sending data associating the predicted action with the at least partially rendered image to the device.

Clause 39. A split rendering server device configured to render media data, the split rendering server device comprising: a memory configured to store media data; and a processing system comprising one or more processors implemented in circuitry, the processing system being configured to: receive pose information representing a predicted pose of a user at a first future time from a device; render an at least partially rendered image for the first future time according to the predicted pose of the user; and send the at least partially rendered image and data associating the pose information with the at least partially rendered image to the device.

Clause 40. The split rendering server device of clause 39, wherein to send the data associating the pose information with the at least partially rendered image, the processing system is configured to send a Real-time Transport Protocol (RTP) header extension including data representative of the pose information.

Clause 41. The split rendering server device of clause 39, wherein the pose information includes an X value, a Y value, and a Z value defining a position; an RX value, an RY value, an RZ value, and an RW value defining a rotation; and a timestamp value indicating the first future time.

Clause 42. The split rendering server device of clause 39, wherein the processing system is further configured to: receive a predicted action of the user from the device; and send data associating the predicted action with the at least partially rendered image to the device.

Clause 43. A method of presenting media data, the method comprising: sending, by a device, pose information representing a predicted pose of a user at a first future time to a split rendering server; receiving, by the device, an at least partially rendered image for the first future time and data associating the pose information with the at least partially rendered image from the split rendering server; and at a second future time, presenting, by the device, a rendered image based on the partially rendered image.

Clause 44. The method of clause 43, wherein receiving the data associating the pose information with the at least partially rendered image comprises receiving a Real-time Transport Protocol (RTP) header extension including data representative of the pose information.

Clause 45. The method of any of clauses 43 and 44, wherein the pose information representing the predicted pose of the user at the first future time includes an X value, a Y value, and a Z value defining a position; an RX value, an RY value, an RZ value, and an RW value defining a rotation; and a timestamp value indicating the first future time.

Clause 46. The method of any of clauses 43-45, further comprising: sending a predicted action of the user to the split rendering server; and receiving data associating the predicted action with the at least partially rendered image.

Clause 47. The method of any of clauses 43-46, further comprising: determining an actual pose of the user at the second future time; and updating the at least partially rendered image based on a difference between the predicted pose and the actual pose to form the rendered image.

Clause 48. The method of any of clauses 43-47, wherein the second future time is equal to the first future time.

Clause 49. The method of any of clauses 43-48, wherein receiving the at least partially rendered image comprises receiving a plurality of at least partially rendered images including the at least partially rendered image, each of the plurality of at least partially rendered images being associated with different future times, the method further comprising: selecting the at least partially rendered image when the first future time, among the different future times, is closest to the second future time.

Clause 50. A device for presenting media data, the device comprising: a memory configured to store media data; and a processing system comprising one or more processors implemented in circuitry, the processing system being configured to: send pose information representing a predicted pose of a user at a first future time to a split rendering server; receive an at least partially rendered image for the first future time and data associating the pose information with the at least partially rendered image from the split rendering server; and at a second future time, present a rendered image based on the partially rendered image.

Clause 51. The device of clause 50, wherein to receive the data associating the pose information with the at least partially rendered image, the processing system is configured to receive a Real-time Transport Protocol (RTP) header extension including data representative of the pose information.

Clause 52. The device of any of clauses 50 and 51, wherein the pose information representing the predicted pose of the user at the first future time includes an X value, a Y value, and a Z value defining a position; an RX value, an RY value, an RZ value, and an RW value defining a rotation; and a timestamp value indicating the first future time.

Clause 53. The device of any of clauses 50-52, wherein the processing system is further configured to: send a predicted action of the user to the split rendering server; and receive data associating the predicted action with the at least partially rendered image.

Clause 54. The device of any of clauses 50-53, wherein the processing system is further configured to: determine an actual pose of the user at the second future time; and update the at least partially rendered image based on a difference between the predicted pose and the actual pose to form the rendered image.

Clause 55. The device of any of clauses 50-54, wherein the second future time is equal to the first future time.

Clause 56. The device of any of clauses 50-55, wherein to receive the at least partially rendered image, the processing system is configured to receive a plurality of at least partially rendered images including the at least partially rendered image, each of the plurality of at least partially rendered images being associated with different future times, and wherein the processing system is further configured to select the at least partially rendered image when the first future time, among the different future times, is closest to the second future time.

Clause 57. A method of rendering media data, the method comprising: receiving, by a split rendering server, pose information representing a predicted pose of a user at a first future time from a device; rendering, by the split rendering server, an at least partially rendered image for the first future time according to the predicted pose of the user; and sending, by the split rendering server, the at least partially rendered image and data associating the pose information with the at least partially rendered image to the device.

Clause 58. The method of clause 57, wherein sending the data associating the pose information with the at least partially rendered image comprises sending a Real-time Transport Protocol (RTP) header extension including data representative of the pose information.

Clause 59. The method of any of clauses 57 and 58, wherein the pose information includes an X value, a Y value, and a Z value defining a position; an RX value, an RY value, an RZ value, and an RW value defining a rotation; and a timestamp value indicating the first future time.

Clause 60. The method of any of clauses 57-59, further comprising: receiving a predicted action of the user from the device; and sending data associating the predicted action with the at least partially rendered image to the device.

Clause 61. A split rendering server device configured to render media data, the split rendering server device comprising: a memory configured to store media data; and a processing system comprising one or more processors implemented in circuitry, the processing system being configured to: receive pose information representing a predicted pose of a user at a first future time from a device; render an at least partially rendered image for the first future time according to the predicted pose of the user; and send the at least partially rendered image and data associating the pose information with the at least partially rendered image to the device.

Clause 62. The split rendering server device of clause 61, wherein to send the data associating the pose information with the at least partially rendered image, the processing system is configured to send a Real-time Transport Protocol (RTP) header extension including data representative of the pose information.

Clause 63. The split rendering server device of any of clauses 61 and 62, wherein the pose information includes an X value, a Y value, and a Z value defining a position; an RX value, an RY value, an RZ value, and an RW value defining a rotation; and a timestamp value indicating the first future time.

Clause 64. The split rendering server device of any of clauses 61-63, wherein the processing system is further configured to: receive a predicted action of the user from the device; and send data associating the predicted action with the at least partially rendered image to the device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of presenting media data, the method comprising:
    sending, by a device, pose information representing a predicted pose of a user at a first future time to a split rendering server;
    receiving, by the device, an at least partially rendered image for the first future time and data associating the pose information with the at least partially rendered image from the split rendering server; and
    at a second future time, outputting for presentation, by the device to a display device, a rendered image based on the partially rendered image.

2. The method of claim 1, wherein receiving the data associating the pose information with the at least partially rendered image comprises receiving a Real-time Transport Protocol (RTP) header extension including data representative of the pose information.

3. The method of claim 1, wherein the pose information representing the predicted pose of the user at the first future time includes an X value, a Y value, and a Z value defining a position; an RX value, an RY value, an RZ value, and an RW value defining a rotation; and a timestamp value indicating the first future time.

4. The method of claim 1, further comprising:
    sending a predicted action of the user to the split rendering server; and
    receiving data associating the predicted action with the at least partially rendered image.

5. The method of claim 1, further comprising:
    determining an actual pose of the user at the second future time; and
    updating the at least partially rendered image based on a difference between the predicted pose and the actual pose to form the rendered image.

6. The method of claim 1, wherein the second future time is equal to the first future time.

7. The method of claim 1, wherein receiving the at least partially rendered image comprises receiving a plurality of at least partially rendered images including the at least partially rendered image, each of the plurality of at least partially rendered images being associated with different future times, the method further comprising selecting the at least partially rendered image when the first future time, among the different future times, is closest to the second future time, the second future time comprising a target display time.

8. A device for preparing media data for presentation, the device comprising:
    a memory configured to store media data; and
    a processing system comprising one or more processors implemented in circuitry, the processing system being configured to:

send pose information representing a predicted pose of a user at a first future time to a split rendering server;

receive an at least partially rendered image for the first future time and data associating the pose information with the at least partially rendered image from the split rendering server; and at a second future time, output for presentation a rendered image based on the partially rendered image.

9. The device of claim 8, wherein to receive the data associating the pose information with the at least partially rendered image, the processing system is configured to receive a Real-time Transport Protocol (RTP) header extension including data representative of the pose information.

10. The device of claim 8, wherein the pose information representing the predicted pose of the user at the first future time includes an X value, a Y value, and a Z value defining a position; an RX value, an RY value, an RZ value, and an RW value defining a rotation; and a timestamp value indicating the first future time.

11. The device of claim 8, wherein the processing system is further configured to:

send a predicted action of the user to the split rendering server; and receive data associating the predicted action with the at least partially rendered image.

12. The device of claim 8, wherein the processing system is further configured to:

determine an actual pose of the user at the second future time; and update the at least partially rendered image based on a difference between the predicted pose and the actual pose to form the rendered image.

13. The device of claim 8, wherein the second future time is equal to the first future time.

14. The device of claim 8, wherein to receive the at least partially rendered image, the processing system is configured to receive a plurality of at least partially rendered images including the at least partially rendered image, each of the plurality of at least partially rendered images being associated with different future times, and wherein the processing system is further configured to select the at least partially rendered image when the first future time, among the different future times, is closest to the second future time, the second future time comprising a target display time.

15. A method of rendering media data, the method comprising:

receiving, by a split rendering server, pose information representing a predicted pose of a user at a first future time from a device;

rendering, by the split rendering server, an at least partially rendered image for the first future time according to the predicted pose of the user; and sending, by the split rendering server, the at least partially rendered image and data associating the pose information with the at least partially rendered image to the device.

16. The method of claim 15, wherein sending the data associating the pose information with the at least partially rendered image comprises sending a Real-time Transport Protocol (RTP) header extension including data representative of the pose information.

17. The method of claim 15, wherein the pose information includes an X value, a Y value, and a Z value defining a position; an RX value, an RY value, an RZ value, and an RW value defining a rotation; and a timestamp value indicating the first future time.

18. The method of claim 15, further comprising:

receiving a predicted action of the user from the device; and sending data associating the predicted action with the at least partially rendered image to the device.

19. A split rendering server device for rendering media data, the split rendering server device comprising:

a memory configured to store media data; and a processing system comprising one or more processors implemented in circuitry, the processing system being configured to:

receive pose information representing a predicted pose of a user at a first future time from a device;

render an at least partially rendered image for the first future time according to the predicted pose of the user; and send the at least partially rendered image and data associating the pose information with the at least partially rendered image to the device.

20. The split rendering server device of claim 19, wherein to send the data associating the pose information with the at least partially rendered image, the processing system is configured to send a Real-time Transport Protocol (RTP) header extension including data representative of the pose information.

21. The split rendering server device of claim 19, wherein the pose information includes an X value, a Y value, and a Z value defining a position; an RX value, an RY value, an RZ value, and an RW value defining a rotation; and a timestamp value indicating the first future time.

22. The split rendering server device of claim 19, wherein the processing system is further configured to:

receive a predicted action of the user from the device; and send data associating the predicted action with the at least partially rendered image to the display device.

* * * * *